US011159035B2

(12) United States Patent
Bikumala et al.

(10) Patent No.: US 11,159,035 B2
(45) Date of Patent: Oct. 26, 2021

(54) PACKAGING CONTAINER AND METHOD FOR CHARGING A STACK OF ELECTRONIC DEVICES

(71) Applicant: EMC IP Holding Company LLC, Hopkinton, MA (US)

(72) Inventors: Sathish Bikumala, Round Rock, TX (US); Jace Files, Round Rock, TX (US); Ares Sakamoto, Lexington, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 16/731,465

(22) Filed: Dec. 31, 2019

(65) Prior Publication Data

US 2021/0203173 A1    Jul. 1, 2021

(51) Int. Cl.
*H01M 10/44* (2006.01)
*H01M 10/46* (2006.01)
*H02J 7/00* (2006.01)
*B65D 81/113* (2006.01)
*B65D 85/00* (2006.01)
*H02J 50/10* (2016.01)

(52) U.S. Cl.
CPC .......... *H02J 7/0044* (2013.01); *B65D 81/113* (2013.01); *B65D 85/00* (2013.01); *H02J 7/0045* (2013.01); *H02J 50/10* (2016.02); *B65D 2585/88* (2013.01)

(58) Field of Classification Search
CPC ........ H02J 7/0044; H02J 7/0045; H02J 50/10; H02J 50/005; B65D 81/113; B65D 2585/88; B65D 85/00

USPC .......... 320/107, 108, 111, 114, 132; 53/428, 53/474

See application file for complete search history.

(56) References Cited

U.S. PATENT DOCUMENTS

| | | | |
|---|---|---|---|
| 5,428,940 A * | 7/1995 | Paumen ................ | B65D 71/16 53/398 |
| 2005/0075695 A1 * | 4/2005 | Schommer ............. | H02J 50/10 607/61 |

(Continued)

FOREIGN PATENT DOCUMENTS

EP    2388886 A1 * 11/2011

OTHER PUBLICATIONS

U.S. Appl. No. 16/791,467, Feb. 14, 2020, Bikumala et al.

*Primary Examiner* — Edward Tso
(74) *Attorney, Agent, or Firm* — Daly, Crowley, Mofford & Durkee, LLP

(57) ABSTRACT

A container for an electronic device having a battery and a method of maintaining electrical charge in the battery are described. The container includes a cushioning material, such as molded expanded foam, to receive and secure the device (e.g. for shipping or storage) and to position its battery charging interface near a charging terminal within the container. The charging terminal itself cushions the device, and is electrically connected to charging terminals on the top and bottom of the container, such as a plate on the top and a pogo pin on the bottom. Connecting the charging terminals to a power source supplies power to the charging terminal, hence the battery charging interface of the device either via a physical contact or wireless power transfer. The container and method may be used to deliver the electronic device fully charged to an end user.

20 Claims, 7 Drawing Sheets

(56) References Cited

U.S. PATENT DOCUMENTS

| | | | |
|---|---|---|---|
| 2006/0132095 A1* | 6/2006 | Liao | H01M 50/20 320/134 |
| 2011/0010313 A1* | 1/2011 | Ozias | B65D 81/107 705/500 |
| 2016/0107009 A1* | 4/2016 | Cordani | B65D 33/18 169/70 |
| 2017/0064437 A1* | 3/2017 | Hviid | H02J 7/0044 |

* cited by examiner

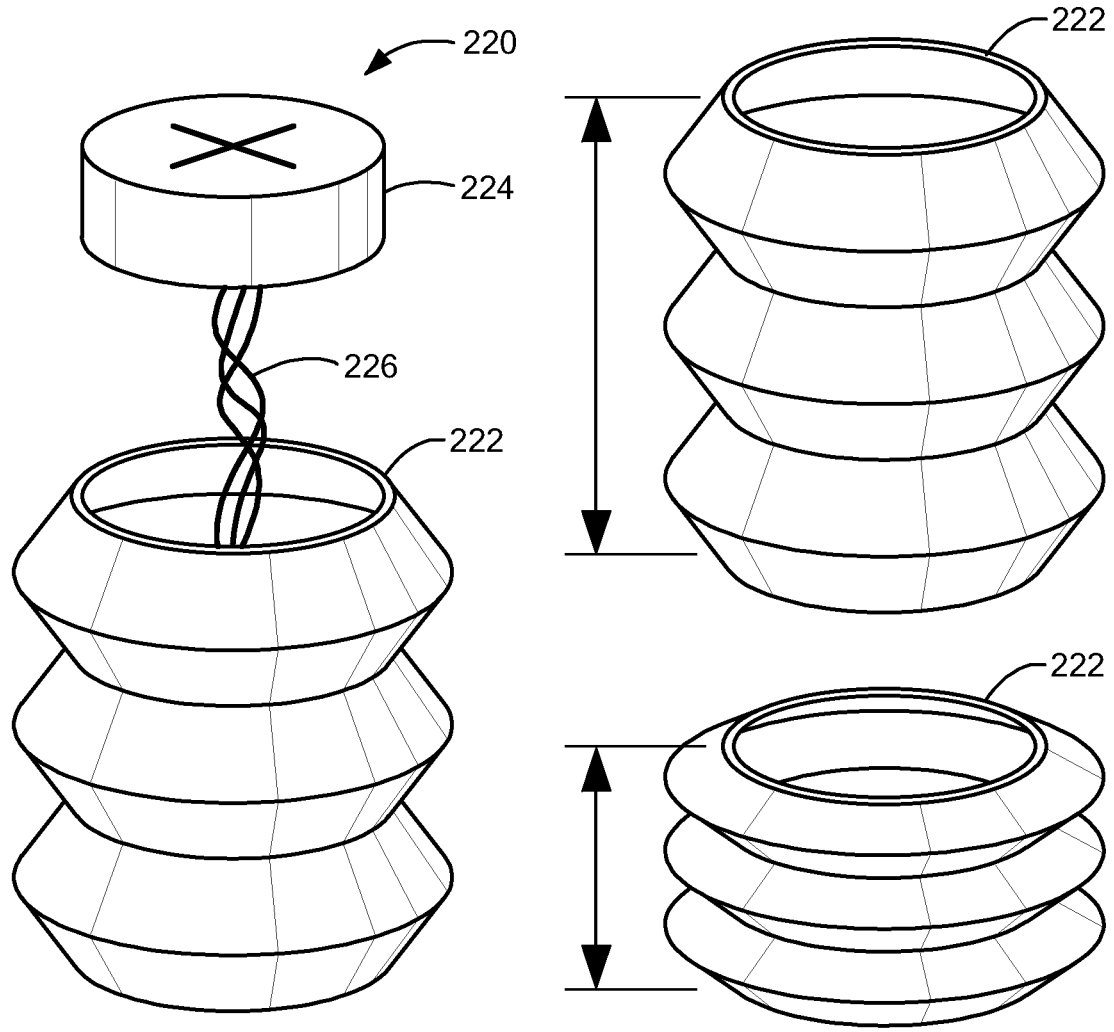
*FIG. 3A*   *FIG. 3B*

PACKAGING CONTAINER AND METHOD FOR CHARGING A STACK OF ELECTRONIC DEVICES

FIELD

The disclosure pertains generally to containers, packaging elements, and packages specially adapted for the storage and transport of devices that operate on stored electrical power, and particularly to systems and methods for enabling delivery of such devices, including and especially computers, fully charged to customers.

BACKGROUND

People who buy an electronic device often are very excited to open the device packaging and begin using the device. This is especially so with devices that offer mobility and that one can start using immediately, like tablet and laptop computers. However, these devices may have less than a maximum stored electrical charge (battery power), requiring customers to initially charge the device and detracting from the enjoyment of unboxing. Major challenges to maintaining a full battery charge include, among other things, a potentially lengthy time to ship and deliver the device, which causes power degradation through the logistics process from manufacturing, to loading, unloading from trucks, transfer to third parties for further kitting, carrier handling, and eventual delivery to the customer.

SUMMARY OF DISCLOSED EMBODIMENTS

Embodiments of the concepts, techniques, and structures disclosed herein include a container (e.g. a shipping and storage box) that charges or recharges batteries of electronic devices already packed therein, and a method for doing so. In this way, the container and the method may be used to deliver the device fully charged to an end user. Particular designs for containers that enable this result are described, as are methods for packing the devices within the containers and for maintaining a full charge during shipping and storage.

In particular, a container embodiment includes a cushioning material, such as molded expanded foam, to receive and secure the device and to position its battery charging interface near a charging terminal within the container. The charging terminal itself cushions the device, and is electrically connected to charging terminals on the top and bottom of the container, such as a plate on the top and a pogo pin on the bottom. Connecting the charging terminals to a power source supplies power to the charging terminal, hence the battery charging interface of the device either via a physical contact or wireless power transfer.

Thus, a first embodiment of the concepts, techniques, and structures disclosed herein is a container for an electronic device that has a battery and an electrical interface for charging or recharging the battery. The container includes an enclosure having a bottom internal surface, a bottom external surface, and a top external surface. The container has a cushioning electrical terminal standing on the bottom internal surface. The container also has an electrical conductor coupled to the electrical terminal, to an electrically conductive plate on the top external surface, and to an elastic electrical connector on the bottom external surface. The container also has a cushioning, non-conductive packing material. The packing material includes a cavity for securely retaining the electronic device with the electrical interface positioned above and adjacent to the electrical terminal. The packing material also includes a cavity through which the electrical conductor passes. By coupling the plate and the connector to a power source, one may provide electrical energy to the cushioning electrical terminal for charging or recharging the battery via the electrical interface.

In some embodiments, the enclosure comprises corrugated fiberboard.

In some embodiments, the electrical interface comprises a second electrical terminal on an exterior surface of the electronic device, and the cushioning electrical terminal comprises a pad for making physical contact with the second electrical terminal.

In some embodiments, the electrical interface comprises a first inductor inside the electronic device, and the cushioning electrical terminal comprises a second inductor for electrically coupling to the first inductor to perform a wireless power transfer.

In some embodiments, the packing material comprises molded expanded polystyrene foam.

In some embodiments, the elastic electrical connector comprises a spring-loaded ("pogo") pin.

In some embodiments, the cushioning electrical terminal comprises an elastic bellows within which is retained a wire. An elasticity of the bellows may be based on a type of the electronic device.

Some embodiments have one or more additional electrical conductors, each electrically coupled to the electrical terminal, to a respective electrically conductive plate on the top external surface, and to a respective elastic electrical connector on the bottom external surface.

A plurality of containers as described above may be stacked (e.g. on a pallet) so that an elastic electrical connector on the bottom external surface of a first one of the plurality is physically and electrically coupled to an electrically conductive plate on the top external surface of a second one of the plurality. In this way, one may charge an entire pallet from a single power source using a "daisy chain."

A second embodiment is a method of maintaining an electrical charge in a battery of an electronic device having an electrical interface for charging or recharging the battery. The method begins with securing the electronic device in a first cavity of a cushioning, non-conductive packing material. The method continues with placing the packing material into an enclosure so that the electrical interface is positioned above and adjacent to a cushioning electrical terminal that is electrically coupled to an electrically conductive plate on a top surface of the enclosure and to an elastic electrical connector on a bottom surface of the enclosure. The method proceeds with sealing the enclosure. The method concludes with coupling the plate and the connector to a power source, thereby providing electrical energy to the cushioning electrical terminal for charging or recharging the battery via the electrical interface.

In some embodiments, the electrical interface comprises a second electrical terminal on an exterior surface of the electronic device, and providing electrical energy to the cushioning electrical terminal comprises providing energy to a pad for making physical contact with the second electrical terminal.

In some embodiments, the electrical interface comprises a first inductor inside the electronic device, and providing electrical energy to the cushioning electrical terminal comprises providing energy to a second inductor for electrically coupling to the first inductor to perform a wireless power transfer.

In some embodiments, the enclosure includes a plurality of electrically conductive plates on the top surface and a corresponding plurality of electrically coupled elastic electrical connectors on the bottom surface, and coupling the plate and the connector to a power source comprises coupling the plurality of plates and connectors to the power source.

Some embodiments continue by repeating the method of maintaining an electrical charge for one or more additional electronic devices, thereby producing a plurality of enclosures, then stacking the plurality of enclosures so that an elastic electrical connector on the bottom external surface of a first one of the plurality is physically and electrically coupled to an electrically conductive plate on the top external surface of a second one of the plurality. In this way, one may charge an entire pallet from a single power source using a "daisy chain."

A third embodiment is a tangible, computer-readable storage medium, in which is non-transitorily stored computer program code that, when executed by a computing processor, performs the method of the second embodiment or any of its above-described variants.

DESCRIPTION OF THE SEVERAL VIEWS OF THE DRAWINGS

The manner and process of making and using the disclosed embodiments may be appreciated by reference to the drawings, in which:

FIG. 3A schematically shows components of a cushioning electrical terminal found in an embodiment;

FIG. 3B schematically shows expanded and compressed views of the cushioning component of the terminal of FIG. 3A;

DETAILED DESCRIPTION OF VARIOUS EMBODIMENTS

Figure 1:
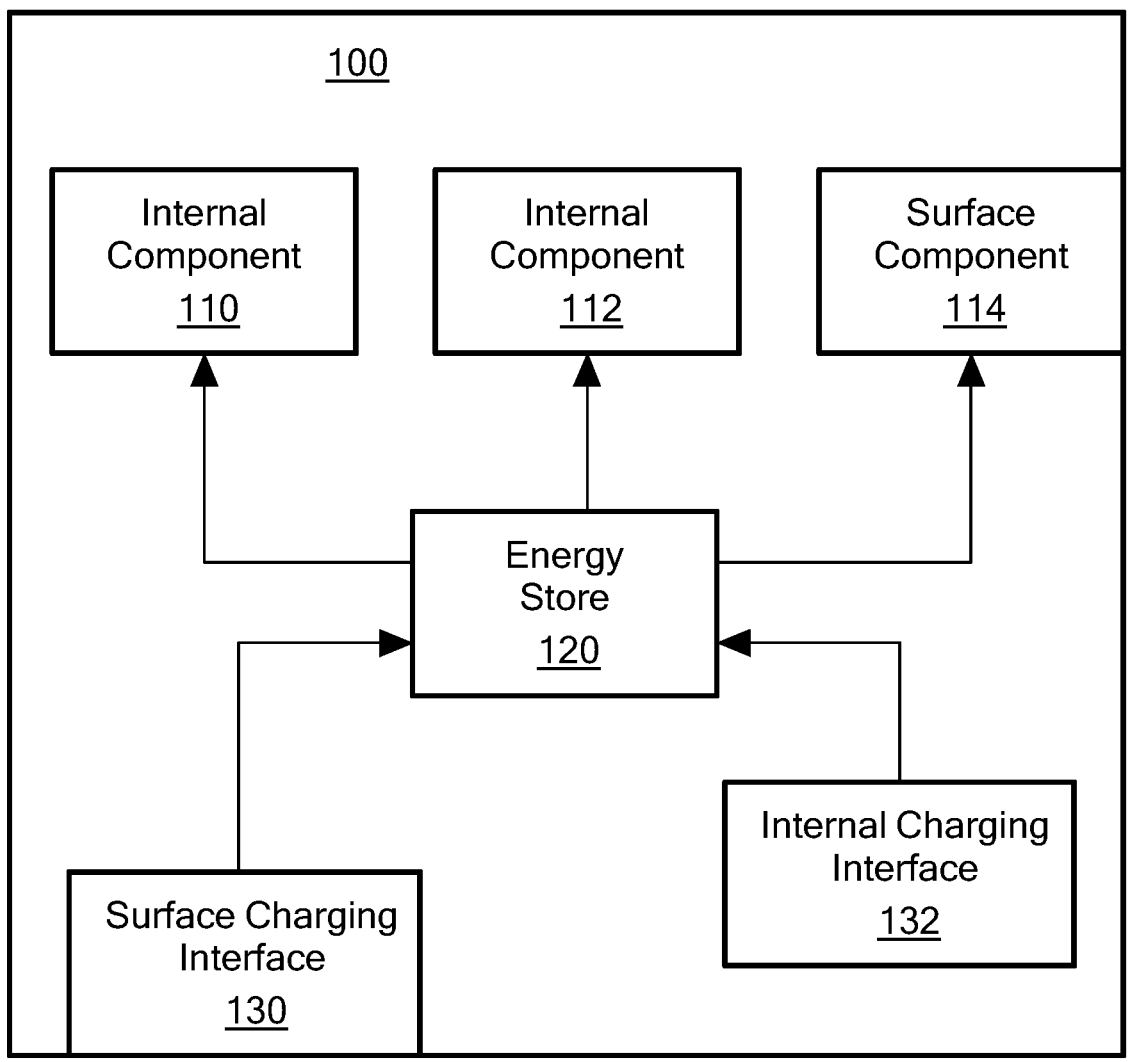
FIG. 1 schematically shows an electronic device compatible for use with embodiments of the concepts, techniques, and structures described herein.

FIG. 1 schematically shows an electronic device 100 compatible for use with various embodiments of the concepts, techniques, and structures described herein. The electronic device 100 may be, without limitation, a smartphone, a tablet computer, a laptop computer, or a desktop computer. In general, however, compatible electronic devices need only have an electrically powered component, an energy store (such as a battery) for powering the component, and some interface for charging or recharging the energy store. It is therefore appreciated that a wide variety of electronic devices may be compatible with embodiments, and that the electronic device 100 depicted in FIG. 1 is illustrative only.

The electronic device 100 includes powered internal components 110, 112 that may be e.g. a central processing unit (CPU) and a storage device such as a solid-state drive (SSD). The electronic device 100 also includes a powered surface component 114 that may be e.g. a touch screen. It is appreciated that the electronic device 100 may include any number of powered components that perform any functions, because embodiments of the concepts, techniques, and structures disclosed herein generally do not depend on the number of powered components or their functional relationships.

More relevant to illustrative embodiments, the electronic device 100 includes an energy store 120 that powers the components 110, 112, 114. In some embodiments, the energy store 120 is a battery that is maintained advantageously at or near a maximum charge. For purposes of this disclosure, "near" a maximum charge means within 10% of the maximum charge, i.e. the energy store 120 is charged to 90% or greater of its maximum operating charge.

The electronic device 100 further includes a surface power interface 130 and an internal power interface 132 for charging or recharging the energy store 120. The surface power interface 130 may be e.g. an electrical port or terminal pads or leads. The internal power interface 132 may be an inductor, such as a charging coil. It is appreciated that the surface power interface 130 and/or the internal power interface 132 may be used to provide power directly to the components 110, 112, and 114; however, illustrative embodiments relate particularly to the use of interfaces 130, 132 for charging or recharging the energy store 120.

Figure 2:
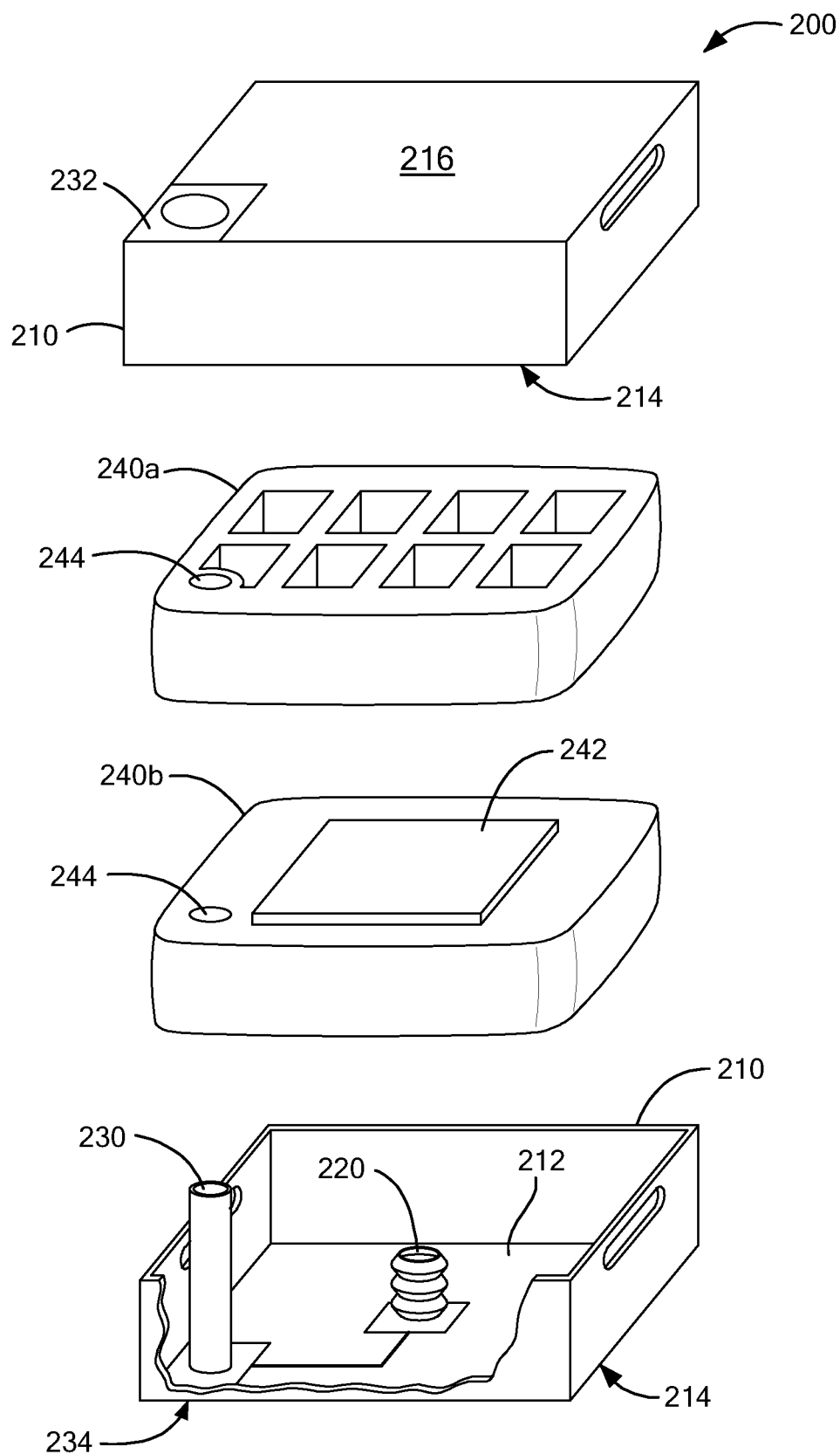
FIG. 2 schematically shows components of a container, in accordance with an embodiment, for use with an electronic device such as that of FIG. 1.

FIG. 2 schematically shows components of a container 200, in accordance with an embodiment, for use with an electronic device. The electronic device must have a battery and an electrical interface for charging or recharging the battery at various points in the transportation and storage logistical processes, and may be the electronic device 100 of FIG. 1. Illustrative embodiments, such as the container 200, provide structural support to the electronic device while advantageously maintaining its battery at or near its maximum charge.

The container 200 has several components. Firstly, it includes an enclosure 210, which protects the contents (including the electronic device, when packed therein) from mechanical damage during transport from a factory, to a distribution center, then to a retail establishment or to an end user (or according to other logistical processes known in the art). The container 200 also includes a cushioning electrical terminal 220 that receives power from outside the enclosure 210 and provides it to the electronic device while simultaneously cushioning the device. The container 200 also has an electrical conductor 230 for coupling to the outside power source while being mechanically separate from the device. And the container 200 includes a packing material 240 (shown in FIG. 2 as material 240a and 240b) for cushioning the device and holding it at a fixed location within the enclosure 210 to permit effective power transfer. These components are now described in more detail.

The enclosure 210 may be e.g. corrugated fiberboard, or other protective material as known in the art of shipping containers. The enclosure 210 has, relevant for purposes of description, a bottom internal surface 212, a bottom external surface 214, and a top external surface 216. The enclosure 210 may have standard physical dimensions for facilitating stacking on crates or pallets in a warehouse. As described below in more detail, these crates or pallets themselves may have electrical terminals and leads for coupling to a charging station, so that an entire stack of containers 200 may be charged at once.

The cushioning electrical terminal 220 stands on the bottom internal surface 212. With reference to FIG. 3A, the cushioning electrical terminal 220 may be formed from an elastic bellows 222, an electrical interface 224 held on a top surface of the bellows 222, and a wire or wires 226 coupled to the interface 224 and retained within the bellows 222.

The elastic bellows 222 may be made of any elastic material known in the art, and its elasticity may be based on a type of the electronic device secured within the enclosure 210. In particular, the elastic bellows 222 should withstand mechanical shocks imposed on the cushioning electrical terminal 220 by the electronic device without damaging the device, while maintaining physical contact between the cushioning electrical terminal 220 and the device. In FIG. 3B is illustrated two views of the elastic bellows 222, at top in an uncompressed state and at bottom in a compressed state according to a mechanical shock. It is appreciated that a person having ordinary skill in the art will understand how to choose a bellows material having an appropriate elasticity.

The electrical interface 224 may be any device or circuit for transferring power to the electronic device. Thus, in some embodiments in which the electronic device has an electrical terminal on its surface (like surface charging interface 130), the electrical interface 224 may be a pad for making physical contact with the surface terminal. However, in other embodiments in which the electronic device may charge inductively (using e.g. an internal charging interface 132), the electrical interface 224 may be an inductor, such as an inductive coil, for charging the device via a wireless power transfer. Some embodiments may have multiple cushioning electrical terminals for charging according to both wired and wireless power transfer.

With reference again to FIG. 2, the electrical conductor 230 is retained within (or is) a post that also stands on the bottom internal surface 212 and provides mechanical rigidity to the container 200. However, it is appreciated that in some embodiments in which additional rigidity is not required, no post is present and the electrical conductor 230 may be simply a conductive tape or wire. The electrical conductor 230 may be made of any conducting material known in the art, which may be selected based on material and manufacturing cost and weight, among other factors.

The electrical conductor 230 is electrically coupled to the cushioning electrical terminal 220, illustratively using the wire or wires 226. The electrical conductor 230 also is electrically coupled to two conductors on the top and bottom, respectively, of the container 200 for accessing power with which to charge the electronic device. In illustrative embodiments, the enclosure 210 has rigid top and bottom surfaces, one or more electrically conductive plates 232 embedded into its top surface, and one or more spring-loaded (or "pogo") pins 234 embedded in its bottom surface. Together, the cushioning terminal 220, the electrical conductor 230, the plate(s) 232, and the pogo pin(s) 234 form a portion of an electrical circuit that includes the electronic device as its electrical load for charging. The choice of these conductor formats is made to ensure a good electrical contact, and it is appreciated that other configurations may be used. For example, in other embodiments the top conductor is a pogo pin and the bottom conductor is a conductive plate.

The packing material 240a and 240b (collectively "packing material 240") holds the electronic device in place for charging, and cushions the device against mechanical shock. The packing material may be e.g. molded expanded polystyrene foam. Illustratively in FIG. 2, the packing material 240a cushions the device against shock toward the top of the container 200, while the packing material 240b cushions the device against shock toward the lateral directions, as discussed below. The cushioning electrical terminal 220 cushions the device against shock toward the bottom of the container 200; thus, the device is cushioned against shock in all directions. It is appreciated that other packing material configurations may be used in embodiments, and that the division of the packing material 240 into two pieces in FIG. 2 is done for illustrative purposes only. A person having ordinary skill in the art may devise other ways to pack an electronic device so that it is cushioned against shock in all directions in accordance with the disclosure herein.

The packing material 240 includes a cavity 242 for securely retaining the electronic device within the container 200. In particular, the cavity 242 should be designed with the physical dimensions of the device in mind, so that the device's electrical charging interface (whether on its surface or internal) is positioned above and adjacent to the cushioning electrical terminal 220. In this way, electrical power may be most effectively transferred from the cushioning electrical terminal 220 to the device's charging interface, and thus to the device's battery. Preferably, the device maintains direct, physical contact with the cushioning electrical terminal 220 at all times, especially when subjected to mechanical shock.

The packing material 240 also includes another cavity 244 through which the electrical conductor 230 passes. That is, the packing material 240b may be placed onto the cushioning electrical terminal 220 in such a way that the cavity 244 fits around the electrical conductor 230 (e.g., fits around the post containing the conductor that stands on the bottom internal surface 212 of the enclosure 210). The electronic device may be placed within the cavity 242 either before or after the packing material 240b is placed within the enclosure 210, as desired. Once the packing material 240b has been placed, the packing material 240a (if present) may be placed, and the enclosure 210 may then be sealed to produce the completed container 200.

Figure 4A:
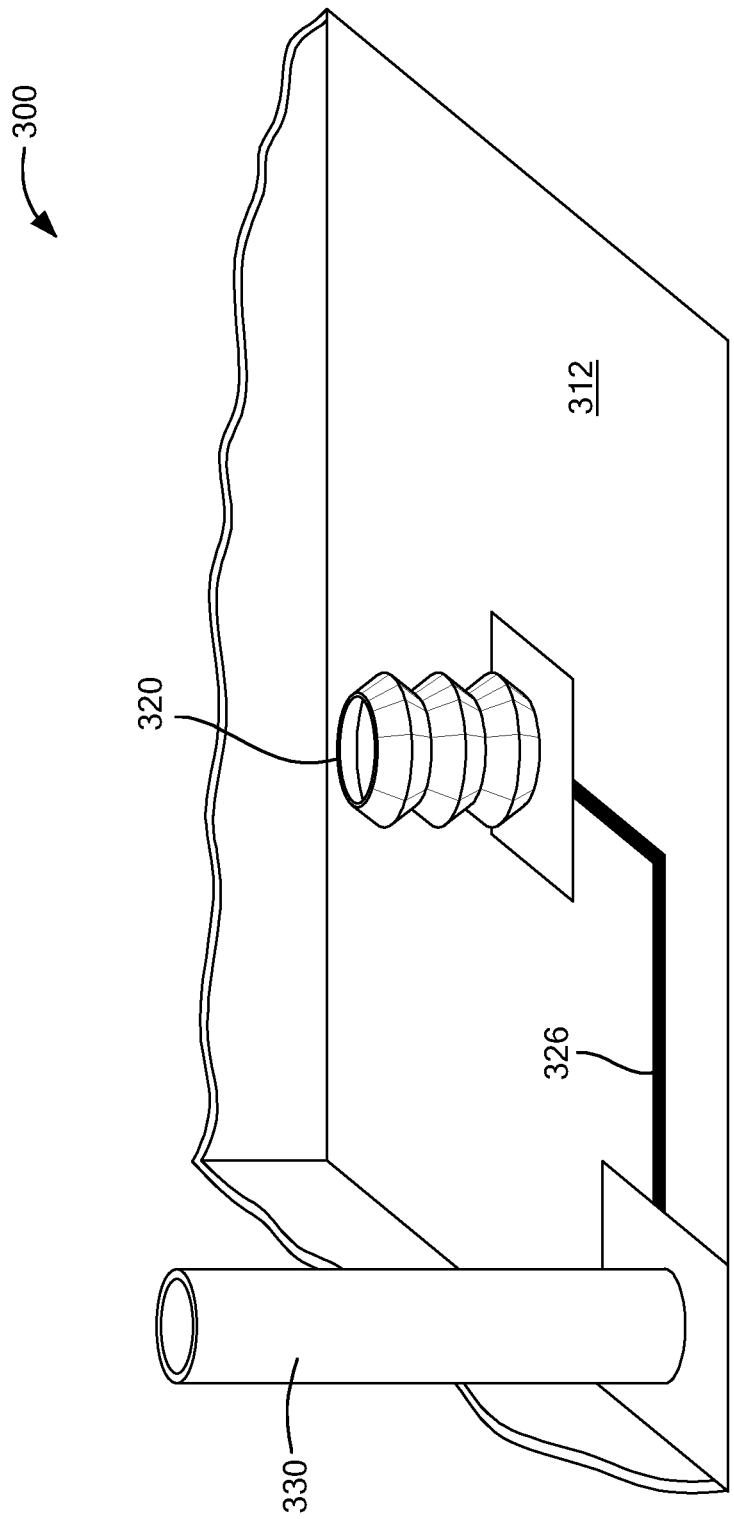
FIG. 4A schematically shows components standing on a bottom surface of a container for an electronic device in accordance with an embodiment.
Figure 4B:
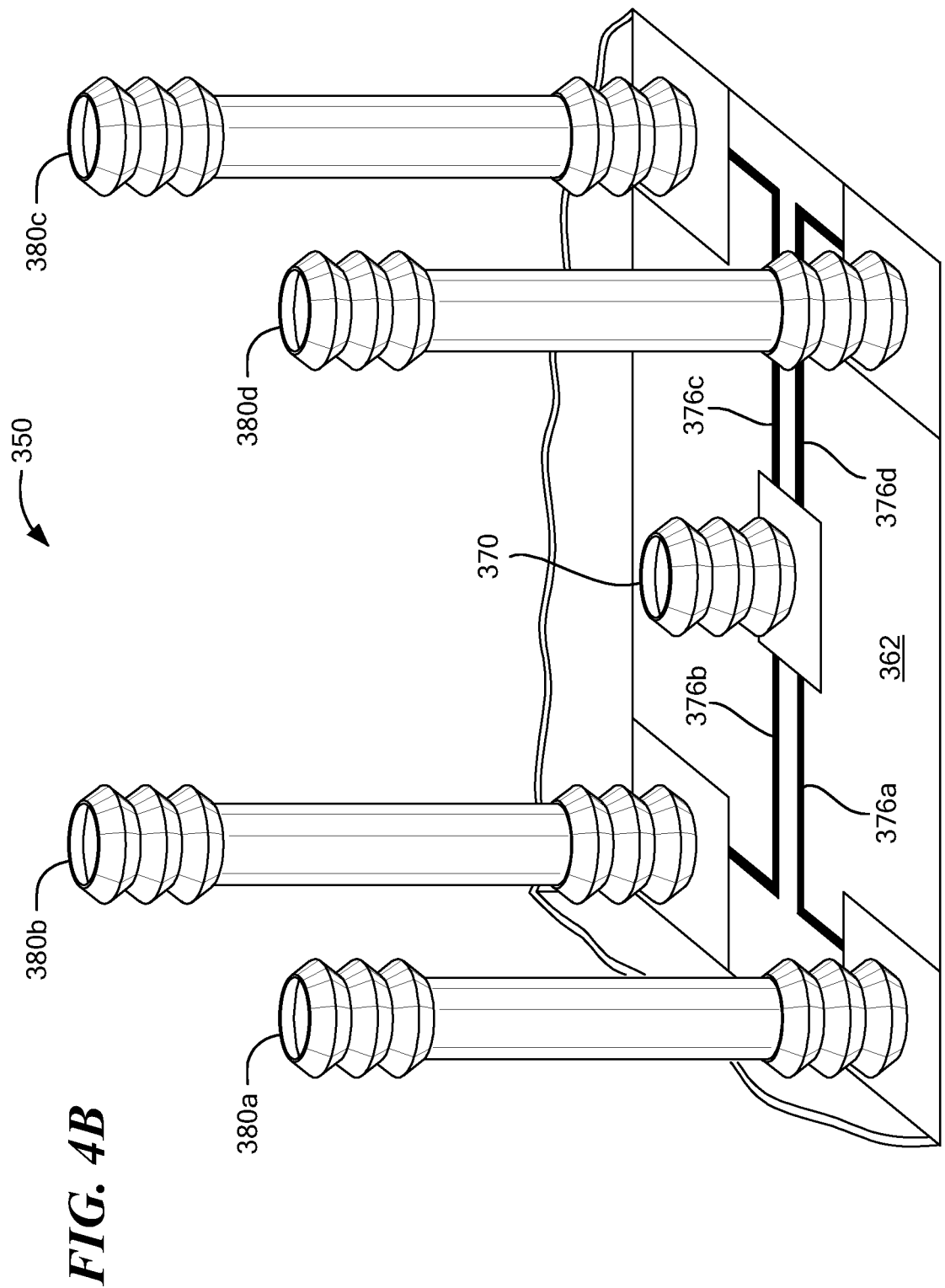
FIG. 4B schematically shows components standing on a bottom surface of a container for an electronic device in accordance with another embodiment.

In FIGS. 4A and 4B are schematically shown components standing on a bottom surface of a container for an electronic device in accordance with two similar embodiments. The embodiment of FIG. 4A shows a portion of a container 300, having an enclosure with a bottom internal surface 312 on which stands a cushioning electrical terminal 320 and a conductive electrical post 330 coupled via a wire 326. The structure of this embodiments is thus similar to that of the embodiment of the container 200 shown in FIG. 2. This arrangement of components is relatively light weight, but provides only a single conduit through which to provide electrical power to the cushioning electrical terminal 320 for charging the electronic device.

The embodiment of FIG. 4B, by contrast, shows a portion of a container 350, having an enclosure with a bottom internal surface 362 on which stands a cushioning electrical terminal 370 and four conductive electrical posts 380a, 380b, 380c, 380d, each of which is coupled to the cushioning electrical terminal 370 via a respective wire 376a, 376b, 376c, 376d. Thus, the embodiment of FIG. 4B differs from that of FIG. 4A in that the former includes additional electrical conductors.

In the illustrative embodiment of FIG. 4B, each electrical conductor 380a, 380b, 380c, 380d is coupled to two conductors on the top and bottom, respectively, of the container 200 for accessing power with which to charge the electronic device. Thus, while the arrangement of components is relatively heavier than that of FIG. 4A, it provide four conduits through which to provide electrical power to the cushioning electrical terminal 320 for charging the electronic device. In some embodiments, two posts 380a, 380c may be used to provide a positive voltage while two posts 380b, 380d may be used to provide an electrical ground. It is appreciated that other embodiments may use different numbers and arrangements of electrical conductors according to usage requirements, and that a person having ordinary skill in the art would understand how to choose such numbers and arrangements.

It is further appreciated that, in the embodiment of FIG. 4B the container 350 (once sealed for storage or transport) has a rotational symmetry about the vertical axis. That is, the container 350 may be rotated 180 degrees about the vertical axis so that the four electrical conductors 380a, 380b, 380c, 380d merely change positions. Thus, the container 350, so rotated, advantageously may physically couple to an external power source (not shown) in exactly the same way as if it were not rotated. In this sense, the plates are redundant with respect to rotation. In some embodiments where the container 350 has a square horizontal cross-section, it has a four-way rotational symmetry and further redundancy is realized.

Such redundancy advantageously simplifies the process of stacking containers to provide a simultaneous charge. Multiple containers identical to container 350 may be stacked one upon another, e.g. on a crate or pallet having appropriately-placed electrical terminals and leads for connecting to a charging station, so that an elastic electrical connector on the bottom external surface of a first container is physically and electrically coupled to an electrically conductive plate on the top external surface of a second container (or to a terminal on the crate or pallet). By then coupling the exposed connectors on top and bottom of the stack to a power source, the entire stack can be charged at once. Moreover, due to the rotational redundancy of the top conductors, only a single set of bottom (elastic) connectors is required in each container. This observation may advantageously reduce manufacturing costs. Also advantageously in this situation, the size of the boxes are identical for a given product, so various stacking patterns may be chosen, so long as electrical connections are retained. However, it is appreciated that if rotational symmetry redundancy is to be utilized, the plates must be large enough to tolerate imprecision in the process of packing the containers.

Figure 5:
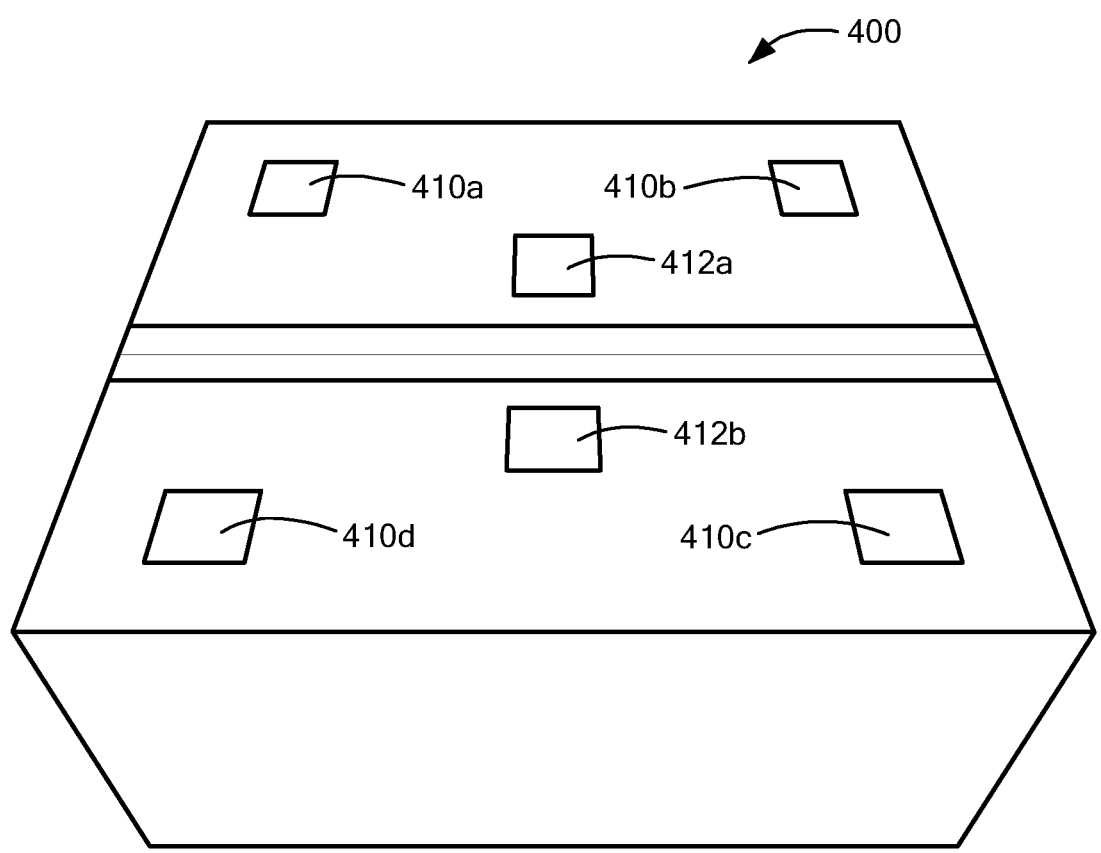
FIG. 5 shows an illustrative container according to an embodiment.

FIG. 5 shows an illustrative container 400 according to an embodiment having a different arrangement of conductive plates on its top surface. The container 400 includes 60 conductive plates. Four of these plates 410a, 410b, 410c, 410d are coupled to electrical conductors, as in FIG. 4B, for providing a charge voltage. One of these posts is coupled to a pogo pin (not shown) on the bottom of the container 400. Two of the plates 412a, 412b are not coupled to electrical conductors, but rather to internal wires for providing a ground voltage. A corresponding pogo pin (not shown) is embedded in the bottom surface of the container 400. It is appreciated that this design retains a 180 degree rotation symmetry, and thus the advantageous redundancies described above.

FIG. 5 is provided as merely one illustration of how the electrical plates and pins may be arranged in accordance with an embodiment of the concepts, techniques, and structures described herein. It is appreciated that other arrangements may be used without deviating from those teachings.

Figure 6:
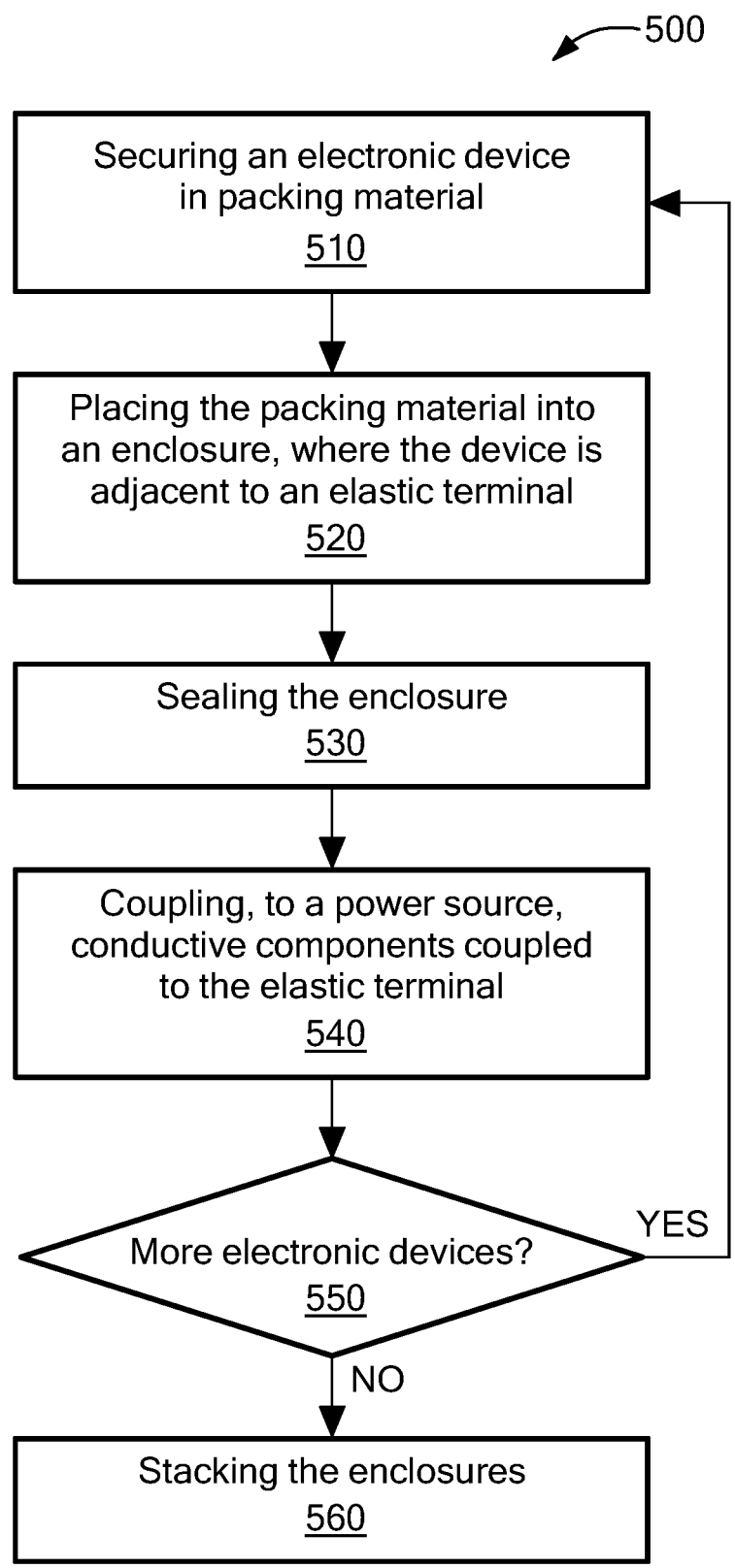
FIG. 6 is a flowchart of a method, in accordance with an embodiment, of maintaining an electrical charge in an electronic device.

FIG. 6 is a flowchart of a method 500, in accordance with an embodiment, of maintaining an electrical charge in an electronic device. The method 500 may be used e.g. with the electronic device 100, the container 200, the container 300, the container 350, or with other structures. It is appreciated that the method 500 may be performed with the use of automated machinery, such as packing robots.

The method 500 begins with a securing process 510 for securing the electronic device in packing material. The packing material may be e.g. packing material 240b, or other packing material.

The method 500 continues with a placing process 520 for placing the packing material into an enclosure so that the electrical interface is positioned above and adjacent to a cushioning electrical terminal. The enclosure may be e.g. the enclosure 210, and the cushioning electrical terminal may be e.g. the terminal 220.

The method 500 proceeds to a sealing process 530 for sealing the enclosure. The sealing process 530 may be performed according to techniques known in the art.

The method 500 concludes with a coupling process 540 for coupling, to a power source, conductive components themselves coupled to the elastic terminal. The relevant conductive components may be, for example, the plate 232 and the elastic pin 234, respectively. Following the coupling process 540, the power source provides electrical energy to the cushioning electrical terminal for charging or recharging the battery via the electrical interface.

It is appreciated that the method 500 can be extended to incorporate advantages discussed above in connection with stacking symmetry and plate redundancy. Thus, the method 500 may optionally continue with a determining process 500 for determining whether more electronic devices should be packaged. If so, the method 500 returns to the first process 510 with respect to an additional electronic device and an additional enclosure, and proceeds as described above. However, if no more electronic devices remain to be packaged, the method proceeds to a stacking process 560 for stacking the enclosures. In accordance with the above-described advantages, the stacking process 560 stacks the enclosures so that an elastic electrical connector on the bottom external surface of a first enclosure is physically and electrically coupled to an electrically conductive plate on the top external surface of a second enclosure.

The techniques and structures described herein may be implemented in any of a variety of different forms. For example, features may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features are grouped together in one or more individual embodiments for the purpose of streamlining the description. This method of description is not to be interpreted as reflecting an intention that the claims require more features than are expressly recited. Rather, inventive aspects may lie in less than all features of each disclosed embodiment.

Having described implementations which serve to illustrate various concepts, structures, and techniques which are the subject of this description, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A container for an electronic device that has a battery and an electrical interface for charging or recharging the battery, the container comprising:
    an enclosure having a bottom internal surface, a bottom external surface, and a top external surface;
    a cushioning electrical terminal standing on the bottom internal surface;
        an electrical conductor coupled to the electrical terminal, to an electrically conductive plate on the top external surface, and to an elastic electrical connector on the bottom external surface; and
    a cushioning, non-conductive packing material having (a) a cavity for securely retaining the electronic device with the electrical interface positioned above and adjacent to the electrical terminal, and (b) a cavity through which the conductor passes;
    wherein coupling the plate and the connector to a power source provides electrical energy to the cushioning electrical terminal for charging or recharging the battery via the electrical interface.

2. The container according to claim 1, wherein the enclosure comprises corrugated fiberboard.

3. The container according to claim 1, wherein the electrical interface comprises a second electrical terminal on an exterior surface of the electronic device, and the cushioning electrical terminal comprises a pad for making physical contact with the second electrical terminal.

4. The container according to claim 1, wherein the electrical interface comprises a first inductor inside the electronic device, and the cushioning electrical terminal comprises a second inductor for electrically coupling to the first inductor to perform a wireless power transfer.

5. The container according to claim 1, wherein the packing material comprises molded expanded polystyrene.

6. The container according to claim 1, wherein the elastic electrical connector comprises a spring-loaded pin.

7. The container according to claim 1, wherein the cushioning electrical terminal comprises an elastic bellows within which is retained a wire.

8. The container according to claim 7, wherein an elasticity of the bellows is based on a type of the electronic device.

9. The container according to claim 1, further comprising one or more additional electrical conductors, each electrically coupled to the electrical terminal, to a respective electrically conductive plate on the top external surface, and to a respective elastic electrical connector on the bottom external surface.

10. A plurality of containers according to claim 1, stacked so that an elastic electrical connector on the bottom external surface of a first one of the plurality is physically and electrically coupled to an electrically conductive plate on the top external surface of a second one of the plurality.

11. A method of maintaining an electrical charge in a battery of an electronic device having an electrical interface for charging or recharging the battery, the method comprising:
    securing the electronic device in a first cavity of a cushioning, non-conductive packing material;
    placing the packing material into an enclosure so that the electrical interface is positioned above and adjacent to a cushioning electrical terminal that is electrically coupled to an electrically conductive plate on a top surface of the enclosure and to an elastic electrical connector on a bottom surface of the enclosure;
    sealing the enclosure; and
    coupling the plate and the connector to a power source, thereby providing electrical energy to the cushioning electrical terminal for charging or recharging the battery via the electrical interface.

12. The method according to claim 11, wherein the electrical interface comprises a second electrical terminal on an exterior surface of the electronic device, and providing electrical energy to the cushioning electrical terminal comprises providing energy to a pad for making physical contact with the second electrical terminal.

13. The method according to claim 11, wherein the electrical interface comprises a first inductor inside the electronic device, and providing electrical energy to the cushioning electrical terminal comprises providing energy to a second inductor for electrically coupling to the first inductor to perform a wireless power transfer.

14. The method according to claim 11, wherein the enclosure includes a plurality of electrically conductive plates on the top surface and a corresponding plurality of electrically coupled elastic electrical connectors on the bottom surface, and coupling the plate and the connector to a power source comprises coupling the plurality of plates and connectors to the power source.

15. The method according to claim 11, further comprising:
    repeating the method of maintaining an electrical charge for one or more additional electronic devices, thereby producing a plurality of enclosures; and
    stacking the plurality of enclosures so that an elastic electrical connector on the bottom external surface of a first one of the plurality is physically and electrically coupled to an electrically conductive plate on the top external surface of a second one of the plurality.

16. A tangible, computer-readable storage medium, in which is non-transitorily stored computer program code that, when executed by a computing processor, performs a method of maintaining an electrical charge in a battery of an electronic device having an electrical interface for charging or recharging the battery, the method comprising:
    securing the electronic device in a first cavity of a cushioning, non-conductive packing material;
    placing the packing material into an enclosure so that the electrical interface is positioned above and adjacent to a cushioning electrical terminal that is electrically coupled to an electrically conductive plate on a top surface of the enclosure and to an elastic electrical connector on a bottom surface of the enclosure;
    sealing the enclosure; and
    coupling the plate and the connector to a power source, thereby providing electrical energy to the cushioning electrical terminal for charging or recharging the battery via the electrical interface.

17. The storage medium according to claim 16, wherein the electrical interface comprises a second electrical terminal on an exterior surface of the electronic device, and providing electrical energy to the cushioning electrical terminal comprises providing energy to a pad for making physical contact with the second electrical terminal.

18. The storage medium according to claim 16, wherein the electrical interface comprises a first inductor inside the electronic device, and providing electrical energy to the cushioning electrical terminal comprises providing energy to a second inductor for electrically coupling to the first inductor to perform a wireless power transfer.

19. The storage medium according to claim 16, wherein the enclosure includes a plurality of electrically conductive plates on the top surface and a corresponding plurality of electrically coupled elastic electrical connectors on the bottom surface, and coupling the plate and the connector to a power source comprises coupling the plurality of plates and connectors to the power source.

20. The storage medium according to claim 16, further comprising program code for:
   repeating the method of maintaining an electrical charge for one or more additional electronic devices, thereby producing a plurality of enclosures; and
   stacking the plurality of enclosures so that an elastic electrical connector on the bottom external surface of a first one of the plurality is physically and electrically coupled to an electrically conductive plate on the top external surface of a second one of the plurality.

* * * * *